(12) United States Patent
Trujillo et al.

(10) Patent No.: US 8,936,063 B1
(45) Date of Patent: Jan. 20, 2015

(54) GARAGE DOOR SPRING WINDING SYSTEM

(71) Applicant: Ronald E. Turner, Brighton, CO (US)

(72) Inventors: Jerry E. Trujillo, Broomfield, CO (US); Ernest Scott Turner, Brighton, CO (US)

( * ) Notice: Subject to any disclaimer, the term of this patent is extended or adjusted under 35 U.S.C. 154(b) by 0 days.

(21) Appl. No.: 14/041,676

(22) Filed: Sep. 30, 2013

Related U.S. Application Data

(63) Continuation-in-part of application No. 12/873,985, filed on Sep. 1, 2010, now Pat. No. 8,567,567.

(60) Provisional application No. 61/238,821, filed on Sep. 1, 2009.

(51) Int. Cl.
*E05F 15/00* (2006.01)
*F03G 1/08* (2006.01)

(52) U.S. Cl.
CPC ....................................... *F03G 1/08* (2013.01)
USPC ............................................ 160/191; 185/39

(58) Field of Classification Search
CPC ........... F03G 1/00; E05F 7/00; E05D 13/1261
USPC ........ 185/37, 39, 9–11, 40; 49/197, 199, 200; 16/400, 401, DIG. 1; 160/191, 192, 315
See application file for complete search history.

(56) References Cited

U.S. PATENT DOCUMENTS

| | | |
|---|---|---|
| 3,921,761 A | 11/1975 | Votroubek et al. |
| 4,293,267 A | 10/1981 | Grove |
| D275,138 S | 8/1984 | Bacon |
| 4,472,910 A | 9/1984 | Iha |
| 4,981,165 A | 1/1991 | Miller et al. |
| 5,203,392 A | 4/1993 | Shea |
| 5,636,678 A | 6/1997 | Carper et al. |
| 5,865,235 A | 2/1999 | Krupke et al. |
| 5,950,701 A | 9/1999 | Rogers |
| 5,964,268 A | 10/1999 | Carper et al. |
| 6,327,744 B1 | 12/2001 | Dorma |
| 6,408,925 B1 | 6/2002 | Dorma |
| 6,508,461 B1 | 1/2003 | Trevorrow et al. |
| 6,615,897 B2 | 9/2003 | Dorma |

*Primary Examiner* — Alan B Waits

(57) ABSTRACT

A system for safely and effectively winding a garage door spring features a hub assembly having a cylindrical hub with a cylindrical channel located there through. The hub assembly features a wheel gear located around the hub and a plurality of engagement prongs designed to snuggly engage a torsion spring winding cone. The hub assembly is divided into a first hub component and a second hub component. The system features a base with a semi-cylindrical notch and an arcuate lid pivotally located thereon. A plurality of support rollers are adjustably located around an inside of the notch and the lid. The hub assembly is positioned on the support rollers. A worm gear that interfaces with the wheel gear is attached to a drive shaft assembly that features a drive shaft that extends from the base for remote operation of the worm gear.

15 Claims, 11 Drawing Sheets

GARAGE DOOR SPRING WINDING SYSTEM

CROSS REFERENCE

This application claims priority to U.S. patent application Ser. No. 12/873,985, filed Sep. 1, 2010, which is a non-provisional of U.S. Provisional Patent Application No. 61/238,821, filed Sep. 1, 2009, the specifications of which are incorporated herein in theft entirety by reference.

FIELD OF THE INVENTION

The present invention relates to a garage door opener spring winding equipment.

BACKGROUND OF THE INVENTION

Tightening torsion springs of overhead doors is extremely dangerous and is typically done by a professional. The task of tightening the torsion springs even when done by a professional is very time consuming. The present invention features a system for safely and effectively winding a garage door spring.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for safely and effectively winding a garage door spring. In some embodiments, the system comprises a hub assembly with a cylindrical hub. In some embodiments, a cylindrical hub side wall is located on an outer surface thereon from a hub first end to a hub second end. In some embodiments, a cylindrical channel is located there through. In some embodiments, a cylindrical channel diameter is larger than a garage door shaft diameter. In some embodiments, a plurality of receiving slots are located on the hub first end. In some embodiments, the hub assembly comprises a wheel gear located on the hub. In some embodiments, the hub assembly comprises a plurality of engagement prongs. In some embodiments, a prong second end is designed to snuggly engage one of the receiving slots. In some embodiments, a prong first end is designed to snuggly engage a torsion spring winding cone.

In some embodiments, the hub assembly is divided into a first hub component and a second hub component. In some embodiments, the first hub component and the second hub component, when detached from another, are each sized to provide access to the cylindrical channel. In some embodiments, the system comprises a base. In some embodiments, a base anterior end comprises a semi-cylindrical notch and an arcuate lid pivotally located on the end thereon opposed to the notch. In some embodiments, a plurality of support rollers are adjustably located radially around an inside of the combined notch and the lid. In some embodiments, the hub assembly is rotatingly located on the support rollers. In some embodiments, a latch securely fastens the lid to the base anterior end holding the hub assembly in place.

In some embodiments, a worm gear is located between the support rollers and the base posterior end. In some embodiments, the worm gear interfaces with the wheel gear. In some embodiments, the worm gear is attached to a drive shaft assembly. In some embodiments, the drive shaft assembly comprises at least a drive shaft. In some embodiments, the drive shaft extends from the base for remote operation of the worm gear. In some embodiments, the drive shaft is designed to be rotated via a crank or a drill.

In some embodiments, the base comprises a support bar mount located on a base side thereon. In some embodiments, the system comprises a support bar. In some embodiments, the support bar is affixedly located in the support bar mount.

In some embodiments, for operation, the hub assembly is secured over the garage door shaft. In some embodiments, the engagement prongs are attached to the torsion spring winding cone and the receiving slots of the hub. In some embodiments, the base is secured to the hub via the notch and the lid. In some embodiments, the support bar is installed in the support bar mount.

In some embodiments, a handle or a drill is placed on the drive shaft to rotate the garage door spring.

DESCRIPTION OF PREFERRED EMBODIMENTS

Figure 1:
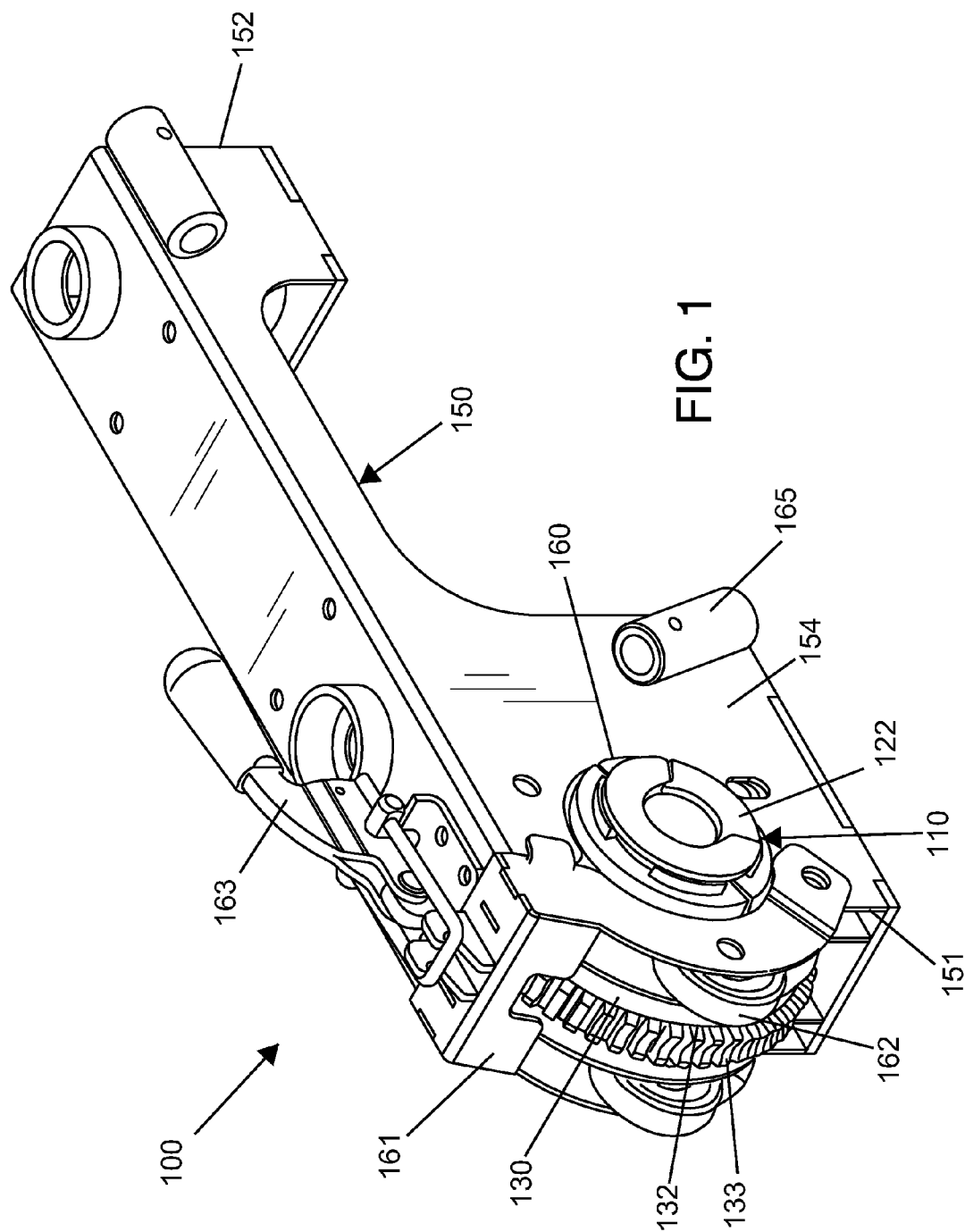
FIG. 1 shows a perspective view of the present invention.
Figure 2:
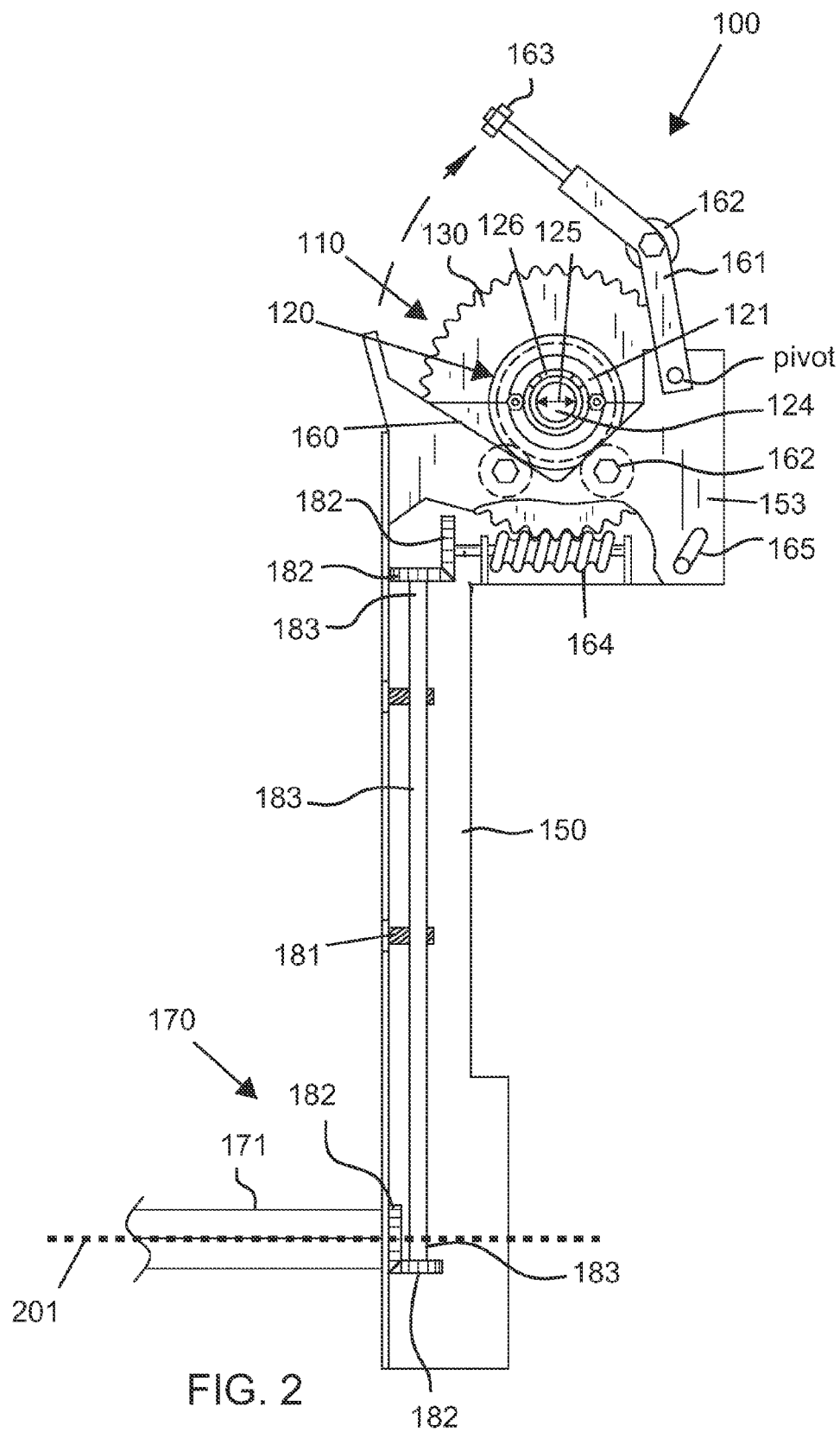
FIG. 2 shows a front view of the present invention.
Figure 3:
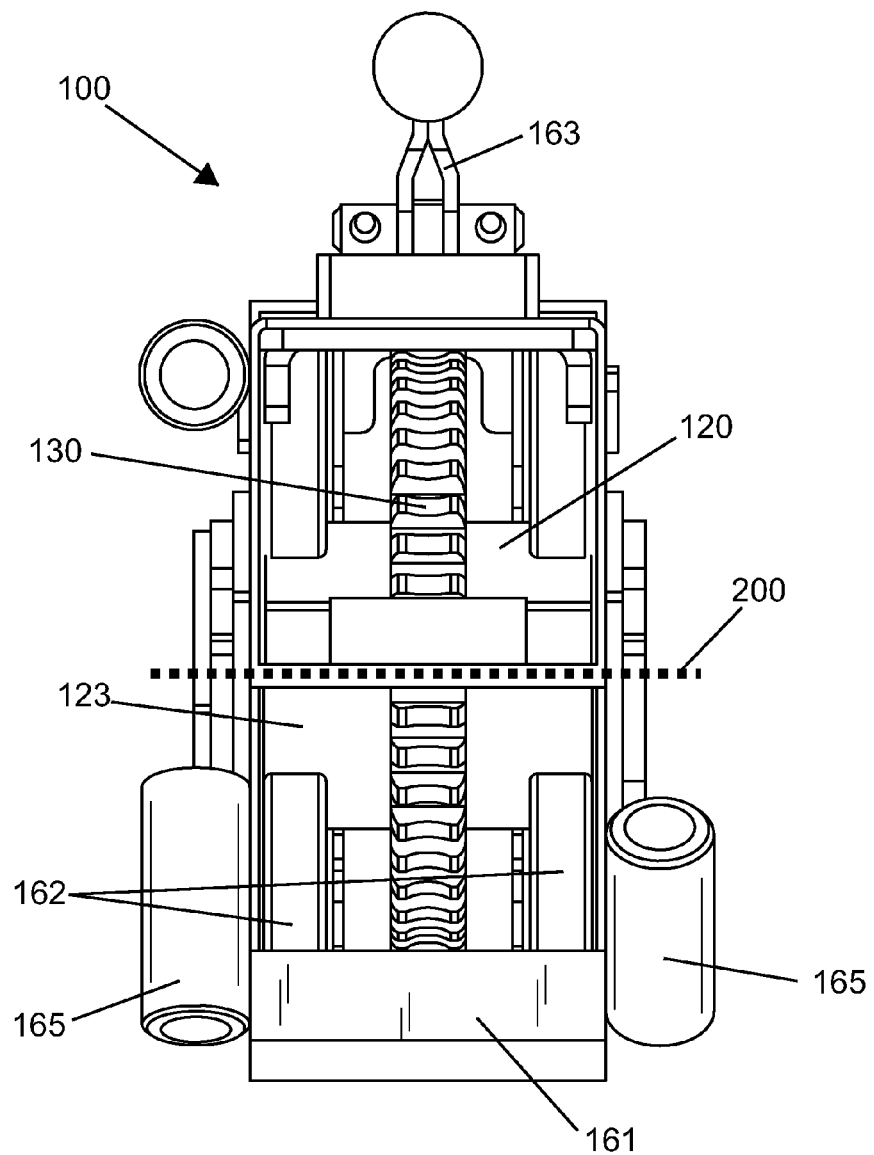
FIG. 3 shows a top view of the present invention.
Figure 4:
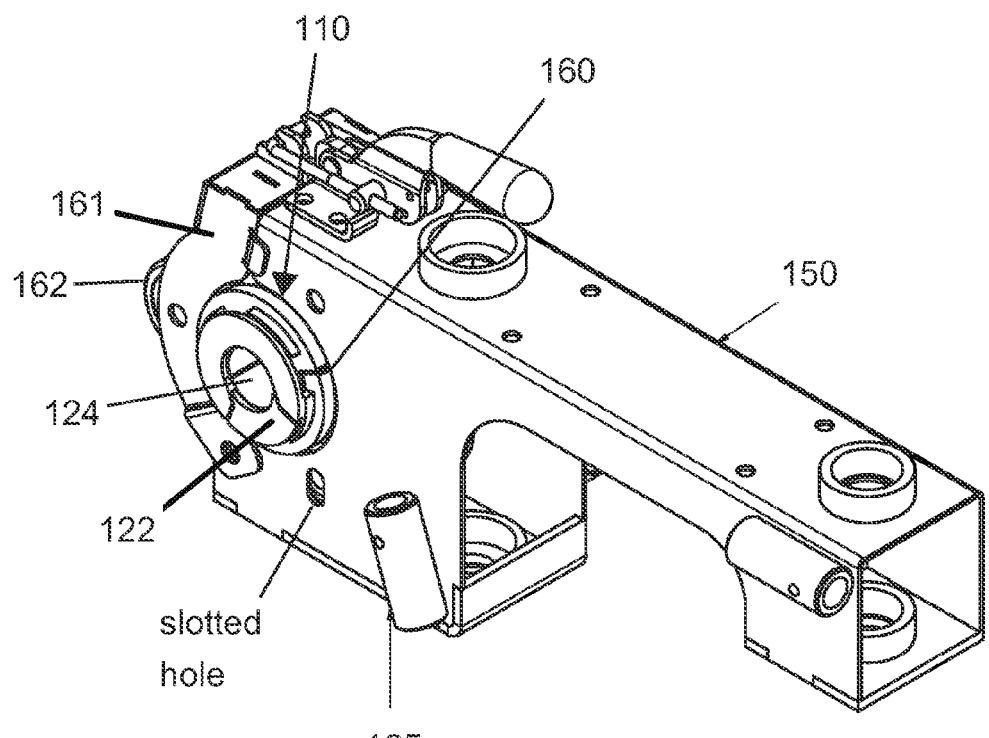
FIG. 4 shows a perspective view of the present invention.
Figure 5:
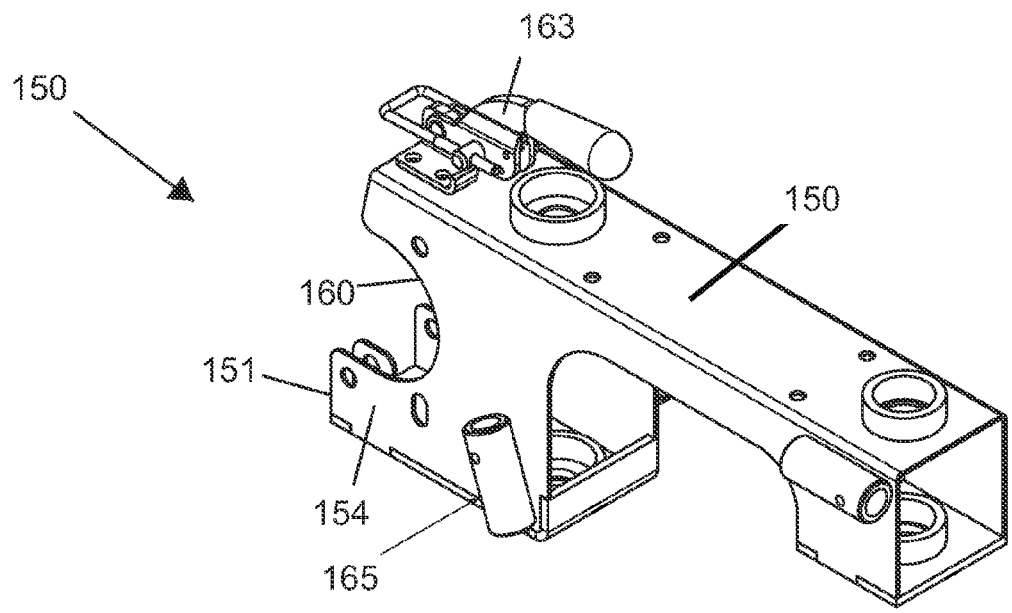
FIG. 5 shows a perspective view of the base of the present invention.
Figure 6:
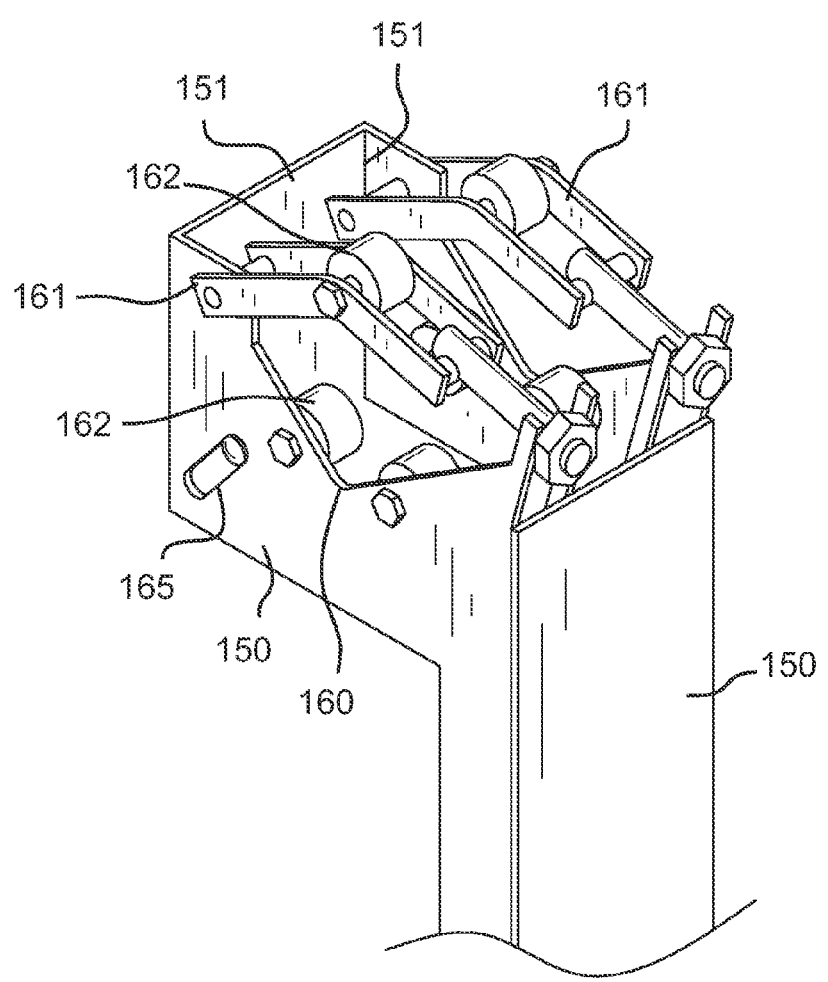
FIG. 6 shows a perspective view of the base anterior end of the present invention.
Figure 7:
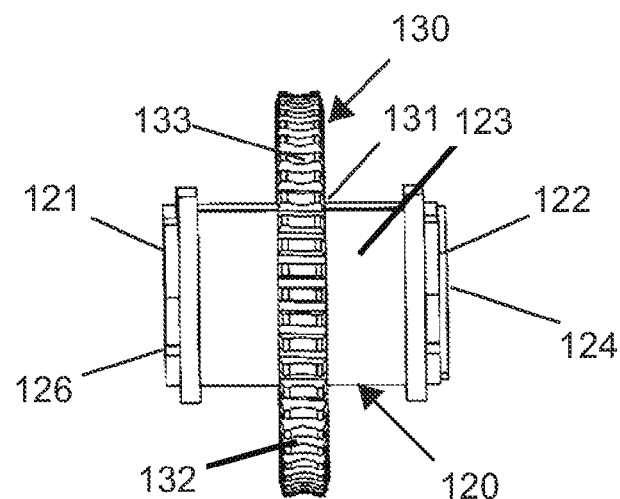
FIG. 7 shows a front view of the hub and the wheel gear of the present invention.
Figure 8:
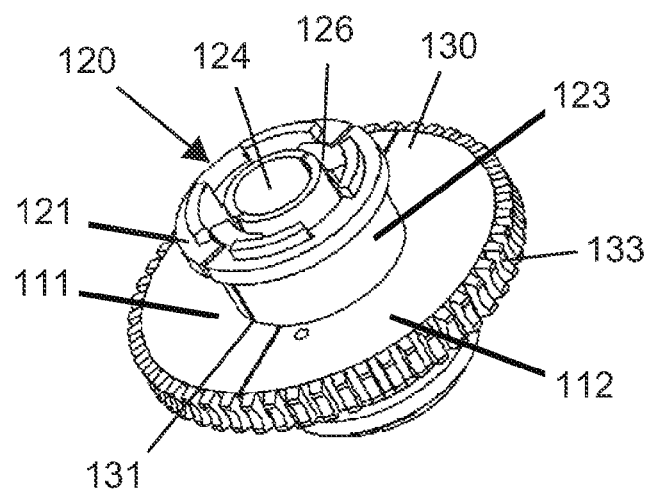
FIG. 8 shows a perspective view of the hub and the wheel gear of the present invention.
Figure 9:
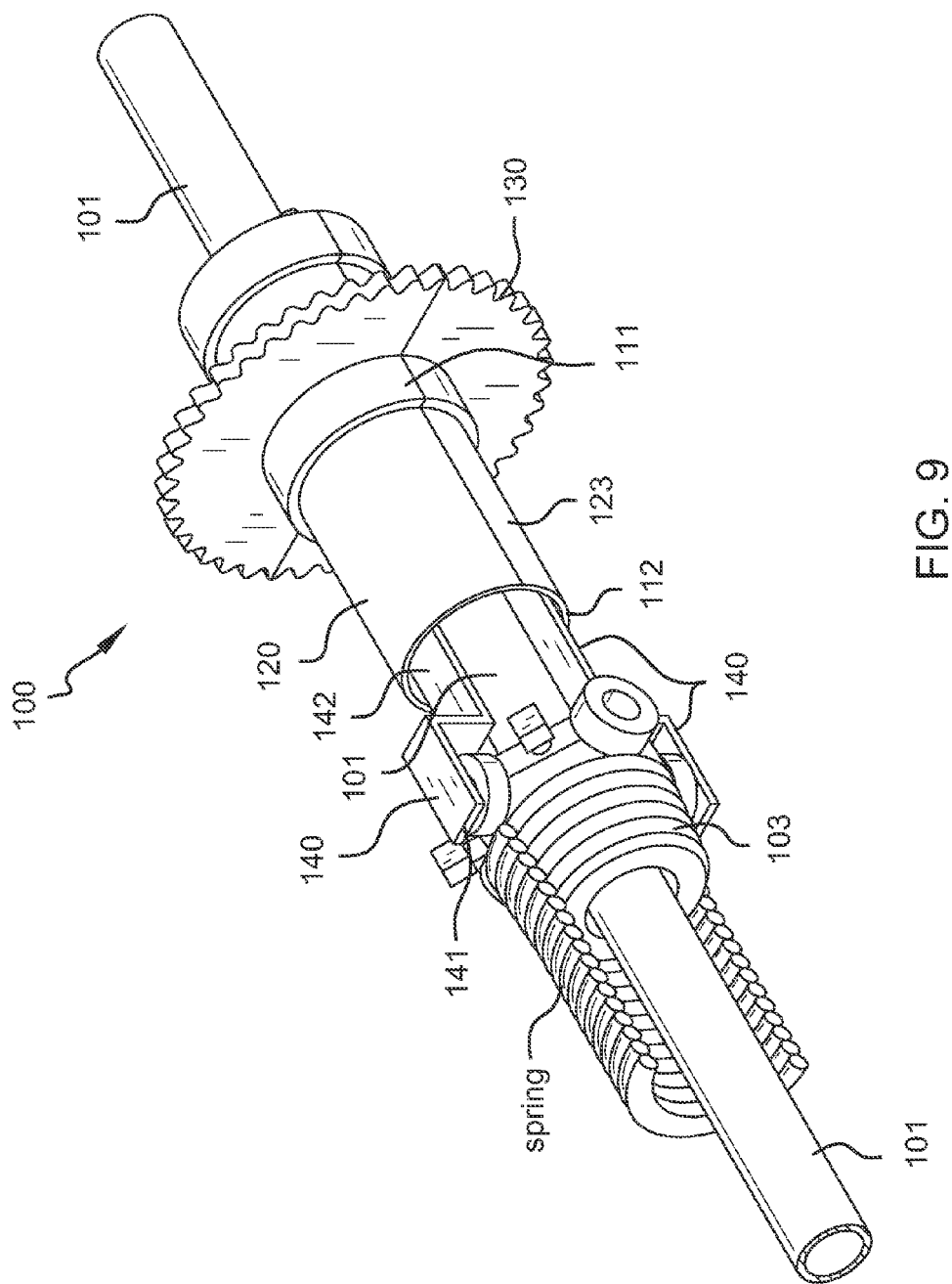
FIG. 9 shows a perspective view of the hub assembly engaging a torsion spring winding cone on a garage door shaft.
Figure 10:
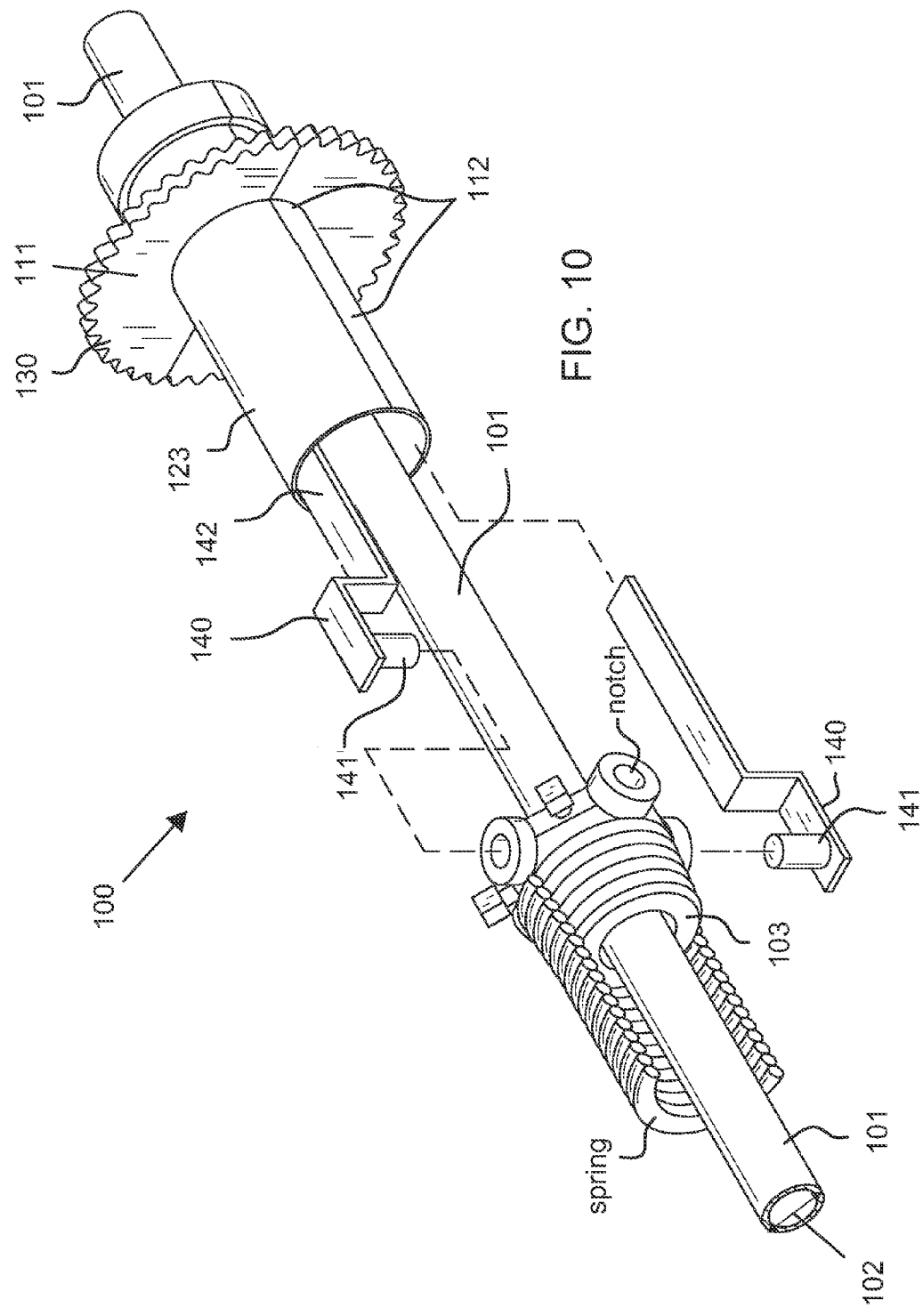
FIG. 10 shows a perspective view of the hub assembly before engaging a torsion spring winding cone on a garage door shaft.
Figure 11:
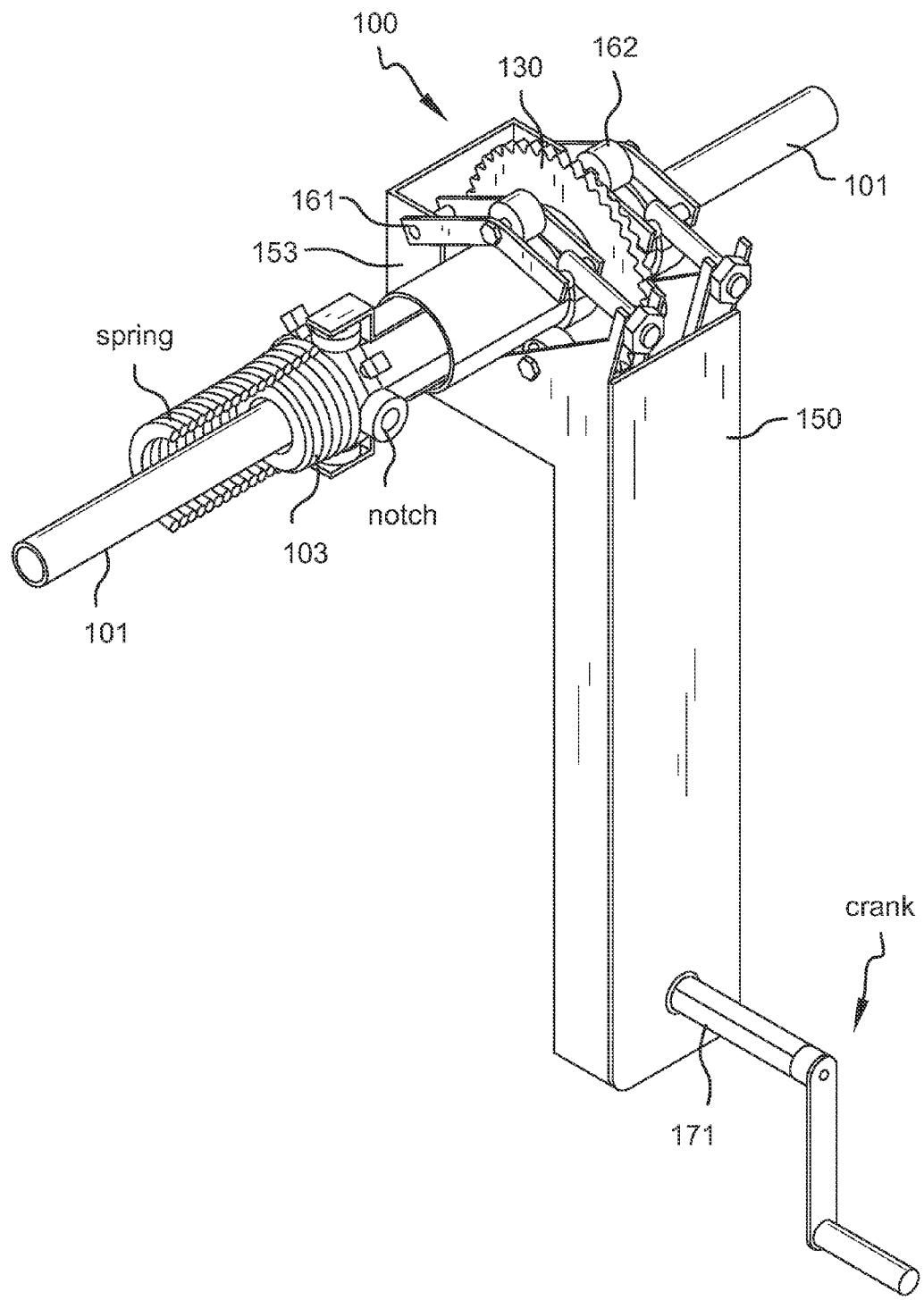
FIG. 11 shows a perspective view of the present invention engaging a torsion spring winding cone on a garage door shaft.
Figure 12:
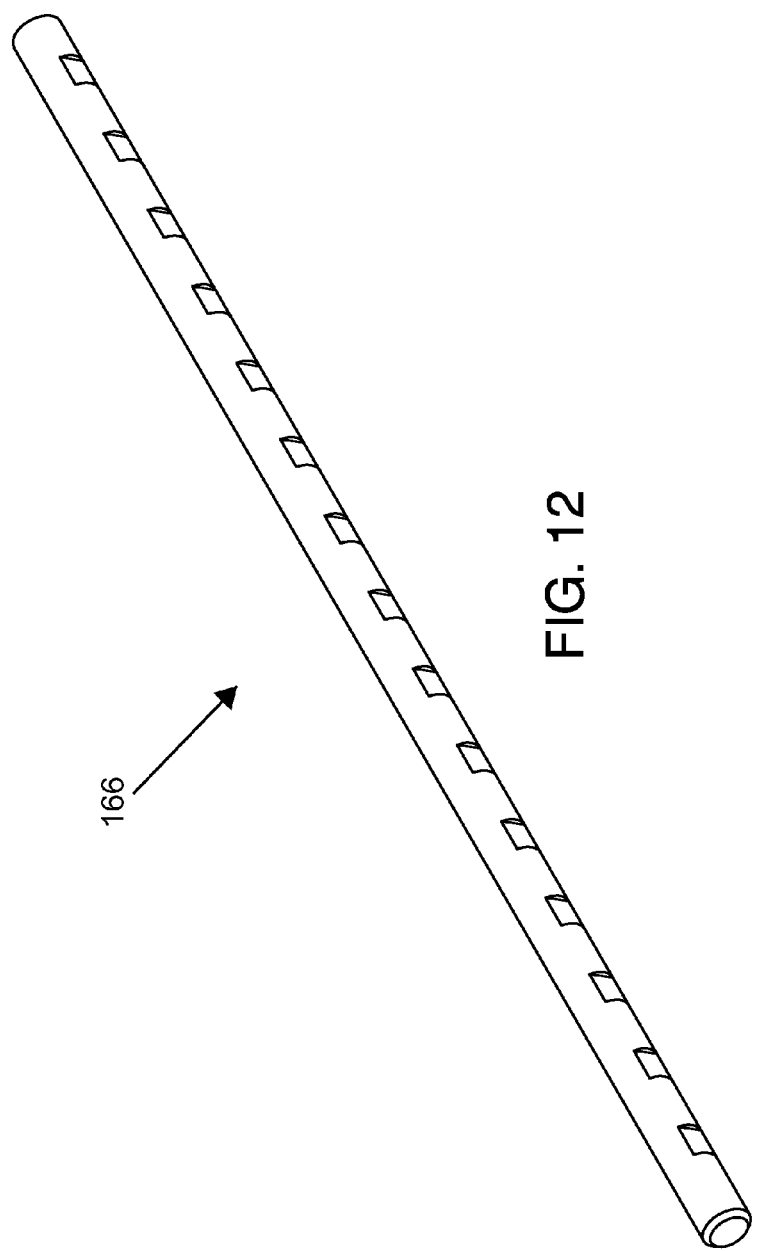
FIG. 12 shows a perspective view of the support bar of the present invention.
Figure 13:
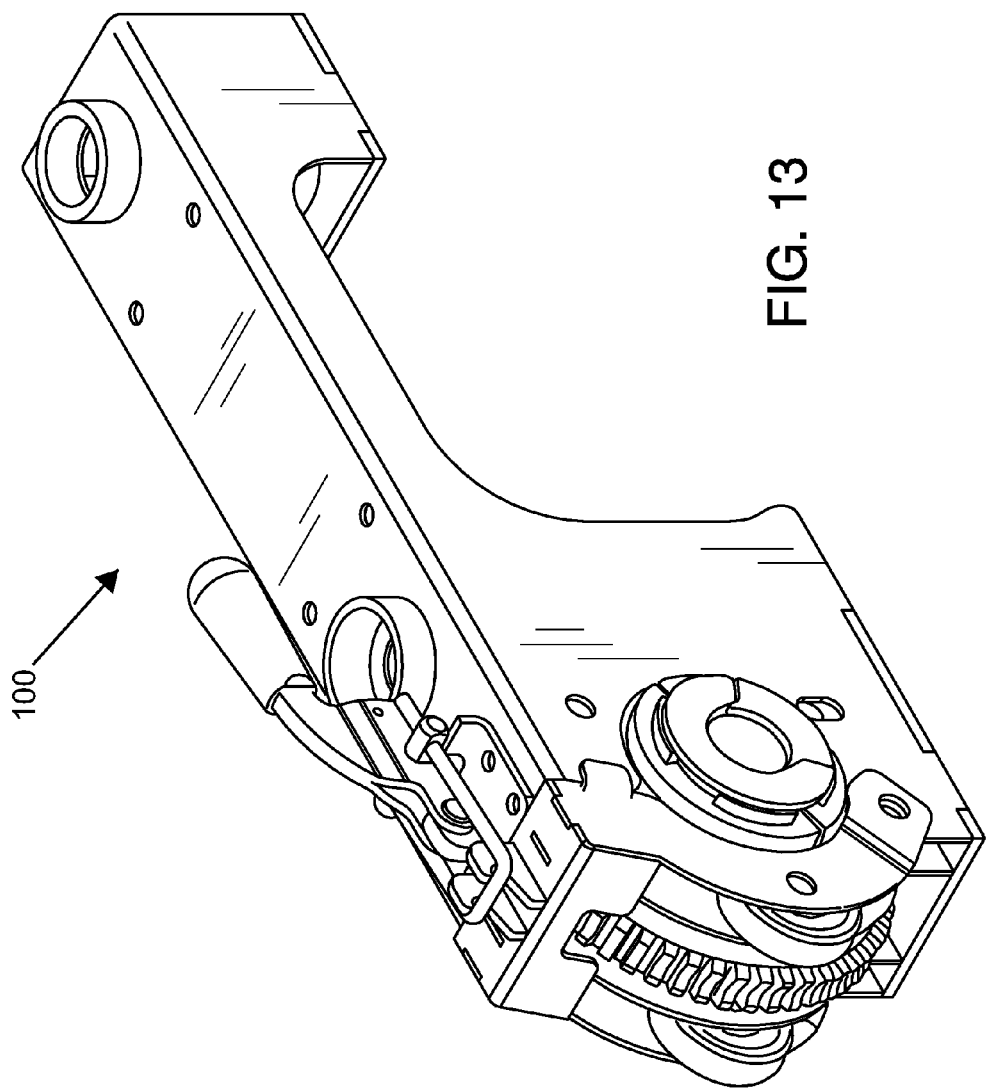
FIG. 13 shows an alternate embodiment of the present invention for residential use.

Following is a list of elements corresponding to a particular element referred to herein:

100 Garage door spring winding system
101 Garage door shaft
102 Garage door shaft diameter
103 Torsion spring winding cone
110 Hub assembly
111 First hub component
112 Second hub component
120 Hub
121 Hub first end
122 Hub second end
123 Hub side wall
124 Cylindrical channel
125 Cylindrical channel diameter
126 Receiving slot 130 Wheel gear
131 Wheel gear center opening
132 Wheel gear outer periphery
133 Gear teeth
140 Engagement prong
141 Prong first end
142 Prong second end
150 Base
151 Base anterior end
152 Base posterior end
153 Base front surface
154 Base rear surface
160 Notch
161 Lid
162 Support roller
163 Latch
164 Worm gear
165 Support bar mount
166 Support bar
170 Drive shaft assembly
171 Drive shaft
181 Pillow block bearing
182 Beveled gear
183 Shaft
200 Axis A
201 Axis B Referring now to FIG. 1-13, the present invention features a garage door spring winding system (100) for safely and effectively winding a garage door spring. In some embodiments, the system (100) comprises a hub assembly (110) comprising a hub (120) having a hub first end (121) and a hub second end (122). In some embodiments, the hub (120) is cylindrical. In some embodiments, a cylindrical hub side wall (123) is located on an outer surface thereof from the hub first end (121) to the hub second end (122). In some embodiments, a cylindrical channel (124) is located there through from the hub first end (121) to the hub second end (122) on an axis A (200). In some embodiments, the cylindrical channel (124) comprises a cylindrical channel diameter (125). In some embodiments, the cylindrical channel diameter (125) is larger than a garage door shaft diameter (102). In some embodiments, a plurality of receiving slots (126) is located on a hub first end (121). In some embodiments, there are two receiving slots (126) located on the hub first end (121).

In some embodiments, the hub assembly (110) comprises a wheel gear (130) located on the hub (120). In some embodiments, a wheel gear center opening (131) is centrally located around and securely fastened to the hub side wall (123). In some embodiments, the wheel gear center opening (131) lies on axis A (200). In some embodiments, a wheel gear outer periphery (132) having gear teeth (133) projects out and away from the hub side wall (123).

In some embodiments, the hub assembly (110) comprises a plurality of engagement prongs (140) having a prong first end (141) and a prong second end (142). In some embodiments, the prong first end (141) is angularly located with respect to the prong second end (142), for example at an angle between zero degrees and 90 degrees. In some embodiments, the prong first end (141) is perpendicularly located with respect to the prong second end (142). In some embodiments, the prong second end (142) is designed to snuggly engage one of the receiving slots (126). In some embodiments, the prong first end (141) is designed to snuggly engage a torsion spring winding cone (103) when the prong second end (142) is installed in the receiving slot (126).

In some embodiments, the hub assembly (110) is divided into a first hub component (111) and a second hub component (112). In some embodiments, the first hub component (111) interfaces with and attachably connects to the second hub component (112) to form the hub assembly (110).

In some embodiments, the system (100) comprises a base (150) having a base anterior end (151) and a base posterior end (152). In some embodiments, the base anterior end (151) comprises a semi-cylindrical notch (160) located at an end thereon from a base front surface (153) to a base rear surface (154). In some embodiments, an arcuate lid (161) is pivotally located at the end thereon opposed to the notch (160) forming a circular structure. In some embodiments, a plurality of support rollers (162) is adjustably located radially around an inside of the combined notch (160) and the lid (161). In some embodiments, there are three support rollers (162) radially located around the inside of the combined notch (160) and the lid (161).

In some embodiments, the hub assembly (110) is rotatingly suspended on the support rollers (162). In some embodiments, the support rollers (162) interface with the hub side wall (123). In some embodiments, a latch (163) securely fastens the lid (161) to the base anterior end (151) holding the hub assembly (110) in place. In some embodiments, the lid (161) is unitary. In some embodiments, the lid (161) comprises a plurality of pieces.

In some embodiments, a worm gear (164) is located between a lowermost support roller (162) and the base posterior end (152) directly beneath the support roller (162). In some embodiments, the worm gear (164) meshingly interfaces with the wheel gear (130). In some embodiments, the worm gear (164) is operatingly attached to a drive shaft assembly (170). In some embodiments, the drive shaft assembly (170) comprises at least a drive shaft (171). In some embodiments, the drive shaft (171) extends from the base (150) for remote operation of the worm gear (164). In some embodiments, the drive shaft (171) is designed to be rotated via a crank or a drill.

In some embodiments, the base (150) comprises a support bar mount (165) located on a base front surface (153) or a base rear surface (154) thereon.

In some embodiments, the system (100) comprises a support bar (166). In some embodiments, the support bar (166) is affixedly located in the support bar mount (165).

In some embodiments, for operation, the first hub component (111) and the second hub component (112) are placed around a garage door shaft (101) having a spring. In some embodiments, the cylindrical channel (124) envelops the garage door shaft (101) when the first hub component (111) is attached to the second hub component (112). In some embodiments, the engagement prongs (140) are securely inserted into the receiving slots (126) of the hub (120) and securely fastened to the torsion spring winding cone (103). In some embodiments, the base (150) engages the hub assembly (110) via the notch (160) and is secured to the hub assembly (110) via the lid (161) closing and cinching around the hub assembly (110). In some embodiments, the support bar (166) is installed in the support bar mount (165). In some embodiments, the handle or the drill is placed on the drive shaft (171) to rotate the garage door spring via the drive shaft assembly (170), the worm gear (164), the hub assembly (110), and the torsion spring winding cone (103). In some embodiments, upon rotation of the system, the support bar (166) is pulled against, then rests against a structure for stability.

In some embodiments, the wheel gear (130) is a spur gear or a helical gear and is mated to the worm gear (164).

In some embodiments, the first hub component (111) and the second hub component (112), when detached from another, are each sized to provide full access to the cylindrical channel (124). In some embodiments, the first hub component (111) and the second hub component (112), when detached from another, are each sized to provide full access to the portions of the cylindrical channel (124) located in each of the first hub component (111) and the second hub component (112).

In some embodiments, the first hub component (111) and the second hub component (112) are designed in a manner to provide at least an open notch width for access to the cylindrical channel (124) in each of the first hub component (111) and the second hub component (112) greater than the cylindrical channel diameter (125) to accommodate sliding over the garage door shaft (101). In some embodiments, the first hub component (111) and the second hub component (112) are not equally sized. In some embodiments, the first hub component (111) is designed in a manner to provide at least an open notch width greater than the cylindrical channel diameter (125) to accommodate sliding over the garage door shaft (101). In some embodiments, the second hub component (112) is designed in a manner to fill in the notch width of the first hub component (111) to form an entire hub assembly (110).

In some embodiments, the first hub component (111) and the second hub component (112) are equally sized, split down a plane from the hub first end (121) to the hub second end (122).

In some embodiments, a gear ratio of the wheel gear (130) to the worm gear (164) is 50 to 1. In some embodiments, a gear ratio of the wheel gear (130) to the worm gear (164) is 40 to 1. In some embodiments, another gear ration may be used to optimize torque based on the tension of the torsion spring.

In some embodiments, the plurality of support rollers (162) are located radially around an inside of the combined notch (160) and the lid (161) having one or more support rollers (162) mounted in slotted holes to facilitate adjustment. In some embodiments, only one hole is slotted. In some embodiments, more than one hole is slotted.

In some embodiments, the drive shaft (171) is located on an axis B (201), perpendicular to axis A (200) and offset from axis A (200).

In some embodiments, the base (150) comprises a first support bar mount (165) located on the base front surface (153) and a second support bar (166) located on the base rear surface (154).

In some embodiments, at least part of the drive shaft assembly (170) is suspended in one or more pillow block bearings (181). In some embodiments, the drive shaft assembly (170) comprises a set of beveled gears (182). In some embodiments, the drive shaft assembly (170) comprises two sets of beveled gears (182). In some embodiments, the drive shaft assembly (170) comprises mounting shims located thereon for adjustment. In some embodiments, the drive shaft assembly (170) comprises a plurality of shafts (183). In some embodiments, there are shafts (183).

In some embodiments, home and commercially sized systems (100) are available with the commercially sized systems (100) being larger and having heavier duty components and a different gear ratio than the home systems (100).

In some embodiments, the base (150) comprises a shape of a "P". In some embodiments, the hub assembly (110), featuring the first hub component (111) and the second hub component (112) is precision machined.

As used herein, the term "about" refers to plus or minus 10% of the referenced number.

The disclosures of the following U.S. Patents are incorporated in their entirety by reference herein: U.S. Pat. No. 5,865,235; U.S. Pat. No. 6,508,461; U.S. Pat. No. 6,408,925; and U.S. Pat. No. 5,636,678.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A garage door spring winding system (100) for winding a garage door spring, wherein the system (100) comprises:
   (a) a hub assembly (110) comprising:
      (i) a hub (120) having a hub first end (121) and a hub second end (122), wherein a cylindrical hub side wall (123) is located on an outer surface from the hub first end (121) to the hub second end (122), wherein a cylindrical channel (124) is located through the hub first end (121) to the hub second end (122) on an axis A (200), wherein the cylindrical channel (124) comprises a cylindrical channel diameter (125), wherein the cylindrical channel diameter (125) is larger than a garage door shaft diameter (102) of a garage door shaft (101), wherein a plurality of receiving slots (126) is located on the hub first end (121),
      (ii) a wheel gear (130) located on the hub (120), wherein a wheel gear center opening (131) is centrally located around and securely fastened to the hub side wall (123), wherein the wheel gear center opening (131) lies on axis A (200), wherein a wheel gear outer periphery (132) having gear teeth (133) projects out and away from the hub side wall (123), and
      (iii) a plurality of engagement prongs (140), each engagement prong (140) having a prong first end (141) and a prong second end (142), wherein the prong first end (141) is angularly located with respect to the prong second end (142), wherein the prong second end (142) is designed to engage one of the receiving slots (126), wherein the prong first end (141) is designed to engage a torsion spring winding cone (103) when the prong second end (142) is installed in the receiving slot (126);

wherein the hub assembly (110) is divided into a first hub component (111) and a second hub component (112), wherein the first hub component (111) interfaces with and attachably connects to the second hub component (112) to form the hub assembly (110);

(b) a base (150) having a base anterior end (151) and a base posterior end (152), wherein the base anterior end (151) comprises a semi-cylindrical notch (160) located at an end thereon from a base front surface (153) to a base rear surface (154), wherein an arcuate lid (161) is pivotally located at the end thereon opposed to the notch (160) forming a circular structure, wherein a plurality of support rollers (162) is adjustably located radially around an inside of the notch (160) and the lid (161) combined;

wherein the hub assembly (110) is rotatingly located on the support rollers (162), wherein the support rollers (162) interface with the hub side wall (123), wherein a latch (163) securely fastens the lid (161) to the base anterior end (151) holding the hub assembly (110) in place;

wherein a worm gear (164) is located between a lowermost support roller (162) and the base posterior end (152), wherein the worm gear (164) meshingly interfaces with the wheel gear (130), wherein the worm gear (164) is operatingly attached to a drive shaft assembly (170), wherein the drive shaft assembly (170) comprises at least a drive shaft (171), wherein the drive shaft (171) extends from the base (150) for remote operation of the worm gear (164), wherein the drive shaft (171) is designed to be rotated via a crank or a drill;

wherein the base (150) comprises a support bar mount (165) located on the base front surface (153) or the base rear surface (154) thereon; and (c) a support bar (166), wherein the support bar (166) is affixedly located in the support bar mount (165);

wherein for operation, the first hub component (111) and the second hub component (112) are placed around the garage door shaft (101) having a spring, wherein the cylindrical channel (124) envelops the garage door shaft (101) when the first hub component (111) is attached to the second hub component (112), wherein the engagement prongs (140) are securely inserted into the receiving slots (126) of the hub (120) and securely fastened to the torsion spring winding cone (103), wherein the base (150) engages the hub assembly (110) via the notch (160) and is secured to the hub assembly (110) via the lid (161) closing around the hub assembly (110), wherein the support bar (166) is installed in the support bar mount (165), wherein the crank or the drill is placed on the drive shaft (171) to rotate the garage door spring via the drive shaft assembly (170), the worm gear (164), the hub assembly (110), and the torsion spring winding cone (103), wherein upon rotation of the system, the support bar (166) is pulled against, then rests against a structure for stability.

2. The system (100) of claim 1, wherein the wheel gear (130) is a spur gear or a helical gear.

3. The system (100) of claim 1, wherein when the first hub component (111) and the second hub component (112) are detached from one another, are each sized to provide full access to the portions of the cylindrical channel (124) located in each of the first hub component (111) and the second hub component (112).

4. The system (100) of claim 3, wherein the first hub component (111) and the second hub component (112) are not equally sized, wherein the first hub component (111) is designed in a manner to provide at least an open notch width greater than the cylindrical channel diameter (125) to accommodate sliding over the garage door shaft (101), wherein the second hub component (112) is designed in a manner to fill in the notch width of the first hub component (111) to form an entire hub assembly (110).

5. The system (100) of claim 1, wherein the first hub component (111) and the second hub component (112) are equally sized, split down a plane from the hub first end (121) to the hub second end (122).

6. The system (100) of claim 1, wherein a gear ratio of the wheel gear (130) to the worm gear (164) is 50 to 1.

7. The system (100) of claim 1, wherein a gear ratio of the wheel gear (130) to the worm gear (164) is 40 to 1.

8. The system (100) of claim 1, wherein the plurality of support rollers (162) is located radially around an inside of the combined notch (160) and the lid (161), wherein at least one support roller (162) is mounted in a slotted hole to facilitate adjustment.

9. The system (100) of claim 1, wherein the drive shaft (171) is located on an axis B (201), perpendicular to axis A (200) and offset from axis A (200).

10. The system (100) of claim 1, wherein the base (150) comprises a first support bar mount (165) located on the base front surface (153) and a second support bar mount (165) located on the base rear surface (154).

11. The system (100) of claim 1, wherein at least part of the drive shaft assembly (170) is suspended in one or more pillow block bearings (181).

12. The system (100) of claim 1, wherein the drive shaft assembly (170) comprises a set of beveled gears (182).

13. The system (100) of claim 1, wherein the drive shaft assembly (170) comprises shims located therein for adjustment.

14. The system (100) of claim 1, wherein the drive shaft assembly (170) comprises a plurality of shafts (183).

15. The system (100) of claim 1, wherein the base (150) is "P" shaped.

* * * * *